United States Patent

[11] 3,593,565

| [72] | Inventor | Roland Holper<br>Seraing, Belgium |
|---|---|---|
| [21] | Appl. No. | 807,820 |
| [22] | Filed | Mar. 17, 1969 |
| [45] | Patented | July 20, 1971 |
| [73] | Assignee | Centre National de Recherches<br>Metallurgiques<br>Brussels, Belgium |
| [32] | Priority | Mar. 22, 1968 |
| [33] | | Belgium |
| [31] | | 712694 |

[54] METHOD FOR MONITORING THE REFINING OF PIG IRON
4 Claims, 1 Drawing Fig.

[52] U.S. Cl............................................................... 73/23,
23/232, 23/255, 318/18, 73/19, 340/172.55,
250/43.5
[51] Int. Cl........................................................ G01n 27/00
[50] Field of Search............................................. 73/19—27,
1 A, 1 D, 1 E, 1 F, 178, 179, 341, 342, 386, 387,
432, 504; 250/43.5, 833, 218; 23/232, 255;
340/172.55

[56] References Cited
UNITED STATES PATENTS

| 2,970,471 | 2/1961 | Summerlin | 73/510 X |
|---|---|---|---|
| 3,000,812 | 9/1961 | Boyd | 208/138 |
| 3,140,598 | 7/1964 | Dunham | 73/23.1 |
| 3,474,659 | 10/1969 | Kelleher | 73/23 X |

*Primary Examiner*—Richard C. Queisser
*Assistant Examiner*—C. E. Snee, III
*Attorney*—Holman & Stern

ABSTRACT: A method for monitoring the operation of refining pig iron characterized in that for the purpose of evaluating the rate of decarburization of the pig iron, use is made of a first capturer the time lag of which is very small and the pass band wide; and the drift of the values supplied by this first capturer is determined and compensated, by means of data supplied by a second capturer the accuracy of which is greater than that of the first capturer.

PATENTED JUL 20 1971 3,593,565
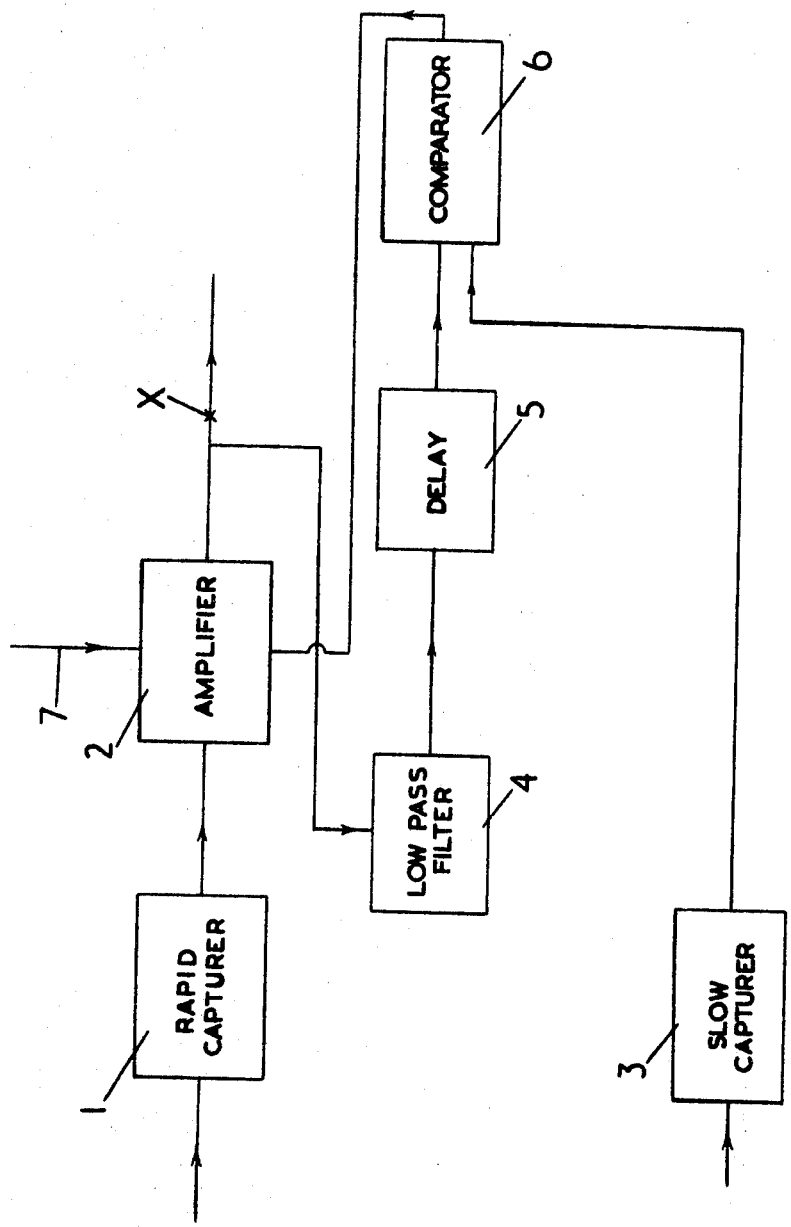
INVENTOR
ROLAND HOLPER
BY Holman, Glascock,
Downing & Seebold
ATTORNEYS

METHOD FOR MONITORING THE REFINING OF PIG IRON

The invention relates to a method for monitoring the refining of pig iron, applicable in particular in the case where the refining is carried out in a converter with oxygen blown in from above.

For the purpose of monitoring the refining operation, in particular when this monitoring has the aim of partial or total automation of the operation, use is made of measurement devices of "capturers," which supply the information necessary for controlling the conduct of the process. Such information includes the rates of enfurnacement and addition, the height of the lance above the bath, the rate of flow of oxygen, and the analysis of the gases. The measurement devices also supply information necessary for the supervision or safety of the installation (oxygen pressure and temperature, temperature of the water in the lance, and CO content of the gases after combustion).

Generally, each of the various parameters is measured by means of a measuring device or capturer which is specific to it. Accordingly, the analysis of the gases may be carried out by means of various types of apparatus (infrared absorption, spectrometer and so on), whereas the intensity of radiation of the gas is supplied by radiation capturers of different types such as photoelectric cells, or bolometers.

Among the most important properties which the capturers must have in order that the information they transmit should be of interest for the dynamic control of the refining operation, there may be mentioned on the one hand the spectrum characteristics and the time lag, and on the other hand the accuracy.

The necessity will immediately be seen of selecting from the various ways of setting up a pig iron refining operation the particular method which makes use of data supplied by accurate capturers and which rapidly supplies the measurements necessary for planning the program, in particular if certain variations based on this measurement are to be made in the refining operation.

In the particular case of the examination of the gases escaping in the converter hood, the results of which examination serve to establish the rate of decarburization of the pig iron, it is possible to use a gas analyzer or radiation capturers in accordance with whether one determines the rate of decarburization from the composition of the gases or from the intensity of radiation of the gases.

As far as concerns gas analyzers, it has been found that their accuracy is in general greater than that of the data supplied by the radiation capturers, provided of course that the devices used are of good quality and are suitably installed, for instance in thermostatically controlled locations. The measurements obtained from the radiation capturers are in actual fact influenced, at least in the present state of the equipment generally available, by the operating conditions, some of which are the result of the refining operation itself.

On the other hand, as far as concerns the pass band or the time lag existing between the moment when a modification of the refining conditions takes place and the moment when the indication is supplied by the capturer (lag between the value at entry and outlet of the procedure) a comparison between radiation capturers, such as photoelectric cells, and gas analyzers shows without doubt that the former are better.

It has been found for instance that the time lag between a modification of the height of the lance (entry value) and the corresponding difference in intensity of radiation of the gases (outlet value) registered by a germanium photodiode is practically nonexistent, whereas the lag between a variation of the rate of flow of oxygen and the corresponding cell signal is of the order of 3 seconds. As far as concerns the gas analyzers, even under the best conditions of use, they can provide only a mediocre control possibility, by reason of their considerable time lag. In actual fact, in the case of modification of the composition of the gases resulting from any change in the operating conditions, the indication of this change is obtained by the gas analyzers only after a delay of approximately 15 to 20 seconds.

The aim of the invention is to provide a method for controlling the refining operation for pig iron, in which the different properties of various capturers are utilized to the best advantage.

According to the invention, a method for controlling the refining of pig iron is characterized in that use is made for the purpose of evaluating the speed of decarburization of the pig iron, of a first capturer the time lag of which is very slight, if necessary the pass band thereof being large; the drift of the values supplied by this first capturer being determined and controlled by means of data supplied by a second capturer the accuracy of which is greater than that of the first capturer. The second capturer may have a long time lag and/or a narrow band, so that its use for accurate direct control is precluded.

In accordance with an advantageous detail of the invention, use is made of at least one radiation capturer, for instance a cell, as the first capturer so as to supply as rapidly as possible the measurements which are desired, and of at least one gas analyzer as the second capturer.

The comparison of the speeds of decarburization obtained by the two methods may be carried out continuously or intermittently during the actual course of the refining operation.

The invention will be further described with reference to the accompanying drawing, which is a block diagram of the circuitry for comparing the signals from the first and second capturers and providing automatic correction.

The embodiment described is given by way of example only, and in no restrictive sense, and to enable a better understanding of the process of the invention.

The problem to be solved concerns passing the signal from a rapid capturer 1 via an automatic gain control amplifier 2 with suitable adjustable gain.

The value of the gain should be determined by comparison of the value of the measurement signal at the output of the amplifier, i.e. at point $x$ in the drawing, with the measurement signal of an accurate but slow capturer 3.

To be able to compare the two signals (at an approximately constant factor) two conditions have to be fulfilled:

1. The two signals should have the same frequency characteristics (i.e. have the same spectra). The rapid capturer having a pass band larger than that of the slow capturer, the rapid measurement signal will have to pass through a low-pass filter. The filter should be constructed in such a way as to give the same spectrum to the two signals. The spectra of the signals may be obtained in different ways, e.g. from autocorrelation functions obtained from measurements on the wave analyzer.

2. The two signals should not have time lag with respect to each other. The more rapid signal will accordingly be delayed by a suitable device 5 for instance a magnetic tape. The time lag may be determined in various ways, for instance by intercorrelation function.

The two signals are then compared in a comparator 6, which gives the signal to vary the gain of the amplifier in such a way as to maintain the equality.

The amplifier 2 is shown as receiving a signal from a line 7 which represents perturbatory factors affecting the gain.

Assuming that the automatic control of gain reacts sufficiently rapidly to control the accuracy of the rapid capturer 1, and this is simply a well-known technological problem, the final error which could influence the corrected system will be smaller to the extent that:

1. The accuracy of the rapid capturer is better;
2. The time lag between the signals is smaller; and
3. The control of the gain may be suitably studied.

If necessary it is possible in certain cases to increase the accuracy of the system by acting simultaneously on the gain of the amplifier and on the automatic control of gain.

EXAMPLE

It is known for instance that the radiation of the converter gases is disturbed during the period of injection of powdered lime. The value of this disturbance may be determined statistically, and suitable action may be taken; for instance, during the injection of the lime, the gain is modified by $x$ percent, which means that it is not necessary to await the comparison of the measurement before acting.

This type of system functions just as well with an analog computer as with a digital converter.

I claim:

1. A method of monitoring the refining of pig iron by determining the rate of decarburization of the pig iron, comprising the following steps performed continuously:
  a. monitoring and measuring the intensity of radiation emitted by flue gas and generating a first signal having a rapid rise time and representative of the composition of the flue gas;
  b. monitoring and measuring the composition of the flue gas by a gas analyzer and generating a second signal representative of such composition, said second signal having a slower rise time and a higher degree of accuracy than said first signal;
  c. amplifying said first signal by a predetermined gain;
  d. low-pass filtering a portion of said amplified first signal, the remainder of such amplifier signal providing a direct information output signal;
  e. delaying the filtered portion of said amplified first signal to provide equivalent rise times of said first and second signals;
  f. comparing the filtered and delayed portion of said amplified first signal with said second signal; and
  g. varying the predetermined amplification gain of the first signal responsive to said comparison in a direction to provide a modified information output signal correlating said first and second signals and having a higher degree of accuracy than said first signal and a more rapid rise time than said second signal.

2. A device for monitoring the refining of pig iron by determining the rate of decarburization of the pig iron, comprising, in combination;
  a. first monitoring means for monitoring and measuring the intensity of radiation emitted by flue gas and adapted to generate a first signal representative of the composition of the flue gas;
  b. second monitoring means for monitoring and measuring the composition of the flue gas and adapted to generate a second signal representative of such composition, said second signal having a slower rise time than said first signal;
  c. variable-gain amplifier means adapted to receive and amplify said first signal;
  d. signal delay means adapted to receive a portion of the amplified signal from said amplifier means and to delay said portion to equalize the rise times of said first and second signals; and
  e. comparator means adapted to receive and compare said delayed portion of the amplified first signal and the second signal, and to vary the gain of said amplifier means responsive to differences between said signals, whereby said amplifier means provides an output signal correlating said first and second signals and having a higher degree of accuracy than said first signal and a more rapid rise time than said second signal.

3. A device as defined in claim 7, further comprising low-pass filter means adapted to filter said portion of the amplified first signal.

4. A device as defined in claim 7, wherein said first monitoring means comprises a radiation sensor, and said second monitoring means comprises a gas analyzer.